(12) United States Patent
Montauti et al.

(10) Patent No.: US 6,356,596 B1
(45) Date of Patent: Mar. 12, 2002

(54) ENCODING AND DECODING METHOD USING A MULTI-STATE SIGNAL

(75) Inventors: Fabrizio Montauti, San Jose; Daran Wang, Campbell, both of CA (US); Alessandro Vannucchi, Monza (IT)

(73) Assignee: P-Com, Inc., Campbell, CA (US)

( * ) Notice: Subject to any disclaimer, the term of this patent is extended or adjusted under 35 U.S.C. 154(b) by 0 days.

(21) Appl. No.: 09/108,554

(22) Filed: Jul. 1, 1998

(51) Int. Cl.[7] .......................... H04L 25/34; H04L 25/49
(52) U.S. Cl. ................................ 375/286; 341/56
(58) Field of Search .................. 375/286, 287, 375/288, 293, 289, 262, 264, 265, 341; 341/56, 57, 58, 70–73; 714/794, 795

(56) References Cited

U.S. PATENT DOCUMENTS 3,775,688 A * 11/1973 Hinoshita .................. 325/42
4,096,520 A * 6/1978 Furuta ...................... 358/133
5,684,833 A * 11/1997 Watanabe .................. 375/286
5,970,098 A * 10/1999 Herzberg ................... 375/264

* cited by examiner

Primary Examiner—Jean Corrielus
(74) Attorney, Agent, or Firm—Skjerven Morrill MacPherson LLP; Janaki Komanduri

(57) ABSTRACT

Two input binary signals are sampled in preparation for being encoded into one signal. The encoded signal is provided with one of the three discrete states based on the sample binary states of the two input signals. A first discrete state is provided if the sampled binary state of the first input signal is a first of two binary states. A second discrete state is provided if the sampled binary state of the first input signal is a second of two binary states, and if two sampled binary states of the second input signal are the same. A third discrete state is provided if the sampled binary state of the first input signal is a second of two binary states, and of the two sampled binary states of the second input signal are different. A corresponding decoding method is also described.

10 Claims, 16 Drawing Sheets

```
ENTITY toggle4 IS
    PORT(
        clk            : IN    BIT;
        input,telmin,morl  : IN    BIT;
        h.l            : OUT BIT);
END toggle4;

ARCHITECTURE a OF toggle4 IS
    TYPE toggle_STATE_TYPE IS (p1, p0, n1, n0, bp0, bn0);
    SIGNAL state    : toggle_STATE_TYPE;
    type telem_state is (one , zero);
    signal telmtry   : telem_state;
    signal telmpos.telmneg.finish.bgs   : bit;
BEGIN
    process( clk)
    begin
        if (clk'event and clk='1') then
            case telmtry is
                when one =>
                    if telmin = '0' then
                        telmtry<=zero;
                        telmneg<= '1';   --onr to zero
                        telmpos<= '0';
                    else
                        if finish = '1' then
                            telmneg<= '0';
                            telmpos<= '0';
                        end if;
                    end if;
                when zero =>
                    if telmin = '1' then
                        telmtry<=one;
                        telmpos<= '1';    --zero to one
                        telmneg<= '0';
                    else
                        if finish = '1' then
                            telmpos<= '0';
                            telmneg<= '0';
                        end if;
                    end if;
            end case;
        end if;
    end process;
    PROCESS (clk)
    BEGIN
        IF (clk'EVENT AND clk = '1') THEN
            CASE state IS
                WHEN p0=>
                    if input = '1' then
                        if telmpos= '1' then
                            state<=p1;
                            finish<= '1';
                            bgs<= '1';
                        else
                            state<=n1;
```

FIG. 12

```
            end if;
    else 'X';
        end if;
        h<= '1';
        l<= '0';
WHEN p1=>
    if bgs= '0' then
        state<=p0;
    else state<=bp0;
    end if;
    h<= '1';
    l<= '1';
    finish<= '0';
when bp0 =>
    if input = '1' then
        if morl = '0' then    --o=1sb
            state<=n1;
            bgs<= '0';
        else state<= p1;
            bgs<= '0';
        end if;
    else 'X';
    end if;
    h<= '1';
    l<= '0';
WHEN n0=>
    if input='1' then
        if telmneg='1' then
            state<=n1;
            finish<= '1';
            bgs<= '1';
        else
            state<=p1;
        end if;
    else 'X';
    end if;
    h<= '1';
    l<= '0';
WHEN n1=>
    if bgs= '0' then
        state<=n0;
    else state<=bn0;
    end if;
    h<= '0';
    l<= '0';
    finish<= '0';
when bn0 =>
    if input = '1' then
        if morl = '0' then    --o=1sb
            state<=p1;
            bgs<= '0';
        else state<=n1;
```

*FIG. 13*

```
                bgs<= '0';
            end if;
        else 'X';
        end if;
        h<= '1';
        l<= '0';
    END CASE;
    END IF;
END PROCESS;
END a;
```

*FIG. 14*

```
ENTITY tgdecd4 IS
    PORT(
        clk             :IN BIT;
        highinv.lowinv  :IN BIT;
        TELMOUT.morl    :OUT BIT);
END tgdecd4;

ARCHITECTURE a OF TGDECD4 IS
TYPE statehltype is (h1,h2,l1,l2);
ATTRIBUTE ENUM_ENCODING                         : STRING;
ATTRIBUTE ENUM_ENCODING OF statehltype : TYPE IS "11 01 10 00";
                                                --H1 H2 L1 L2
SIGNAL stateh1 : statehltype;                   --3  1  2  0
signal high, low  :bit;
BEGIN
high <= highinv;
low <= lowinv;
process(clk)
    begin
        if clk' event and clk='1' then
            case stateh1 is
                when h1 =>
                    if low='1' then
                        stateh1<= l1;
                    else
                        if high ='1' then
                            telmout<='1';
                            stateh1<=h2;
                        end if;
                    end if;
                    morl<= '0';
                when h2 =>
                    if low='1' then
                        stateh1<= l1;
                        morl<= '0';
                    else
                        if high ='1' then
                            stateh1<=h1;
                            morl<= '1';
                        end if;
                    end if;
                when l1 =>
                    if high ='1' then
                        stateh1<=h1;
                    else
                        if low='1' then
                            telmout<= '0';
                            stateh1<=l2;
                        end if;
                    end if;
                    morl<= '0';
                when l2 =>
                    if high ='1' then
                        stateh1<=h1;
```

*FIG. 15*

```
                    else
                        if low='1' then
                            morl<= '1';
                            stateh1<=l1;
                        end if;
                    end if;
--              WHEN OTHERS =>
--                  STATEHL<=L1;

end case;
        end if;
    end process;

END a;
```

*FIG. 16*

Obtaining a sampled binary state of a first signal, a first sampled binary state of a second signal, and a second sampled binary state of said second signal. — 1900

Providing a multi-state signal having at least said first, second, and third discrete states, wherein said providing of said multi-state signal further comprises, before providing said first, second, or third signal portions, providing a fourth signal portion having said second discrete state, wherein if a condition that said first sampled binary state of said second signal is the same as said second sampled binary state of said second signal is true, an intermediate portion between said second and fourth portions has, at most, a first discrete state, and wherein if said condition is false, said intermediate portion between said third and fourth signal portions has, at most, said first discrete state; providing a first signal portion of said first discrete state in response to said sampled binary state of said first signal being a first binary state; providing a second signal portion of said second discrete state in response to said sampled binary state of said first signal being a second binary state, but only upon a condition that said first sampled binary state of said second signal is the same as said second sampled binary state of said second signal; and providing a third signal portion of said third discrete state in response to said sampled binary state of said first signal being said second state, but only if said condition is false. — 1902

FIG. 19

ENCODING AND DECODING METHOD USING A MULTI-STATE SIGNAL

BACKGROUND OF THE INVENTION

1. Field of the Invention

This invention relates to signal transmission and particularly to systems and methods for encoding and decoding multiple transmitted signals.

2. Description of the Related Art

There are a variety of conventional methods for transmitting signals corresponding to different channels of information. One method uses a dedicated line for each channel of data and transmits in parallel. This method has the disadvantage of requiring multiple transmission lines which typically require more area and cost than using a single line.

Therefore, technologies have developed to transmit data from more than one channel over a single line. One convention method of accomplishing this is called time multiplexing in which each channel is assigned a specific time slot. For example, the encoder allocates times 0 to 20 for the first channel, times 20 to 40 for the second channel, and so forth. Since the times directly correspond to the channel, the decoder can identify and separate the channels according to the time of transmission.

In another conventional method, data from a channel is lead by a header or introductory data that identifies the channel of the data to follow. However, this method may delay some information and require additional signal capacity for the header.

A way of transmitting multiple channels on a single line without time multiplexing or addition of header information is desired.

SUMMARY OF THE INVENTION

A variety of signal format use signal redundancy in order to detect signal errors. The principles of the present invention use signal redundancy to transmit different channels of information (and more information) instead of using the signal redundancy to detect signal errors.

For example, in AMI coding, a three-state signal is produced having, for example, a positive state, a negative state, and a neutral state. A neutral state represents a 0 while the positive and negative states each represents a 1. A 1 is represented by a positive state (or negative state) if the most recent 1 was represented by a negative state (or positive state). An error is manifest by two consecutive positive states without an intervening negative state, or two consecutive negative states without an intervening positive state.

In an encoding method according to the present invention, a sampled binary state of a first input signal is obtained. A second input signal is sampled twice to obtain two sampled binary states. A transmitted signal initially has one of the three discrete states. The state is selected based on the sample binary states of the two input signals. The transmitted signal has a first of the three discrete states (e.g., ground) if the sampled binary state of the first input signal is a first of two binary states (e.g., a 0). The transmitted signal has a second of the three discrete states (e.g., a positive voltage) if the following two conditions are satisfied:

1) the sampled binary state of the first input signal is a second of two binary states (e.g., a 1), and
2) both sampled binary states of the second input signal are the same.

The transmitted signal has the third of the three discrete states (e.g., a negative voltage) if the following two conditions are satisfied:

1) the sampled binary state of the first input signal is a second of two binary states (e.g., a 1), and
2) the sampled binary states of the second input signal are different.

A decoding method decodes two binary signals from a multi-state signal having at least three discrete states. The first binary signal is provided with a signal portion having one of two binary states in response to the multi-state signal having a first discrete state. Otherwise, the first binary signal is provided with a signal portion having the other binary state. The second binary signal is provided with a signal portion having one of two binary states in response to the multi-state signal having the second discrete state. The second binary signal is provided with a signal portion having the other of the two binary states in response to the multi-state signal having the third discrete state. For example, the decoding method may transition the second binary signal or maintain the second binary signal at its previous state based on whether the multi-state signal has the second or third discrete states.

These methods allow an encoding of several signals into one multi-state signal, and for the decoding of the multi-state signal.

BRIEF DESCRIPTION OF THE DRAWINGS

FIGS. 12, 13, and 14 show a software encoding entity "TOGGLE4".

FIGS. 15 and 16 show a software decoding entity "TGD-ECD4".

FIGS. 17–20 are flow diagrams illustrating a technique of the invention.

Use of the same reference symbols in different figures indicates similar or identical items.

DESCRIPTION OF THE INVENTION

Figure 1:
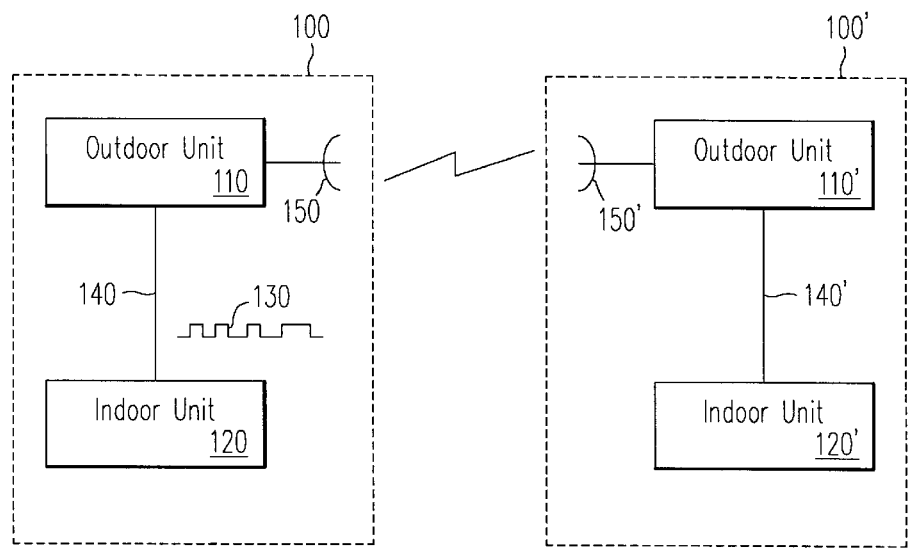
FIG. 1 is a block diagram of a data transmission system in accordance with an embodiment of the invention.

FIG. 1 is a block diagram of two transmission systems 100 and 100' electromagnetically coupled at respective antennas 150 and 150'. System 100 includes an indoor unit 120 which is electrically coupled to outdoor unit 110 via a medium 140 which carries a data signal Tx. System 100' is configured similar to system 100 as shown in FIG. 1.

Figures 2, 3:
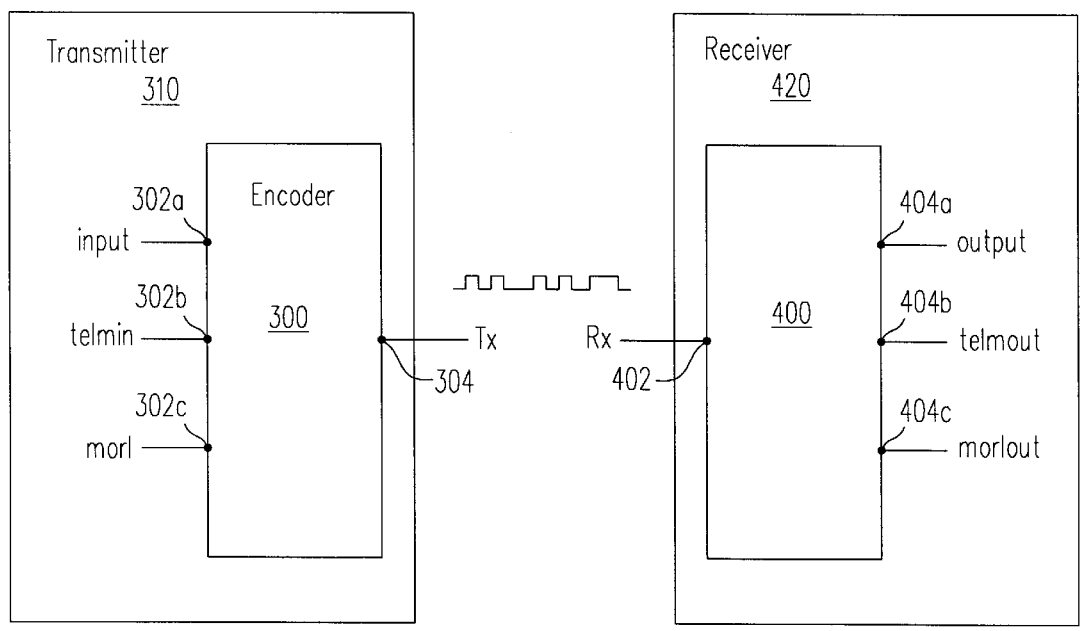
FIG. 2 shows an embodiment of a transmitter of which may be provided in the indoor and outdoor units of FIG. 1.
FIG. 3 shows an embodiment of a receiver which may be provided in the indoor and outdoor units of FIG. 1.

FIG. 2 shows an embodiment of a transmitter 310 that includes an encoder 300 configured to receive three signals "input", "telmin", and "morl" at respective input terminals 302a, 302b, and 302c. Encoder 300 encodes and combines signals "input", "telmin", and "morl" according to a process described below, and transmits the encoded data signal Tx on an output terminal 304.

FIG. 3 shows an embodiment of a receiver 420 that includes a decoder 400 configured to a data signal Rx (corresponding to data signal Tx) on an input terminal 402. Decoder 400 decodes received data signal Rx according to the decoding process described below and generates decoded signals "output", "telmout", and "morlout" on respective output terminals 404a, 404b, and 404c. The signals "output", "telmout", and "morlout" correspond to respective signals "input", "telmin", and "morl" encoded in the transmitter 310.

In one embodiment of system 100 of FIG. 1, indoor unit 120 includes an encoder such as encoder 300 for encoding a signal such as data signal Tx to be transmitted to outdoor unit 110 via medium 140. The indoor unit 120 may also include a decoder such as decoder 400 for decoding a signal such as data signal Rx received from outdoor unit 110 via medium 140. Similarly, outdoor unit 110 includes an encoder and a decoder for transmitted and received signals on medium 140. The encoder and decoder can also be used for bi-directional data transfers with remote radio system 100' via antennas 150 and 150'.

One embodiment of the encoding technique in accordance with the invention can best be understood by first describing an alternate mark inversion (AMI) format for data transmission. The AMI format is a three-state format in which binary 0 values are represented in a data signal by a "0" state (e.g., a ground voltage) for an entire bit period. Hereinafter, the "0" state for an entire bit period is represented as "0,0" state. A binary 1 value is represented in the data signal by a "+1" state (e.g., a positive voltage state) for half a bit period followed by a "0" state for half a bit period (hereinafter, "+1,0" state) if the previous binary 1 value was represented by a "−1" state (e.g., a negative voltage state) for half a bit period followed by a "0" state for half a bit period (hereinafter, "−1,0" state). A binary 1 value is represented in the data signal by a "−1,0" state if the previous binary 1 value was represented by a "+1,0" state. For example, if a first bit of value 1 is represented by a "+1,0" state, the next bit of value 1 is represented by the "−1,0" state. The next bit of value 1 is represented by the "+1,0" state. The AMI format provides error checking through the consistency of the alternating "+1,0" and "−1,0" states. For example, the receiver can detect that a transmission error has occurred if the receiver detects that there are two "+1,0" states with no intervening "−1,0" states.

Encoded data signal Tx has three states: "+1,0" state, "−1,0" state and "0,0" state. Signals "input", "telmin", and ∓morl" are encoded into data signal Tx as follows. For each time interval, encoder 300 selects one of the three discrete states for data signal Tx. The state selected for each interval depends on signals "input", "telmin", and "morl". In particular, for each time interval i, encoder 300 assigns to data signal Tx a bit di corresponding to the "0,0" state if a corresponding bit ai of signal "input" (the highest bit rate signal) has value 0. If a bit ai represented by signal "input" has value 1 during interval i, encoder 300 assigns either the "+1,0" state or the "−1,0" state to the corresponding bit di of signal Tx. Whether encoder 300 selects state "+0" or "−1,0" depends on signals "telmin" and "morl".

In an exemplary encoding process, a low-to-high transition in signal "telmin" is encoded as two uses of the "+1,0" state in data signal Tx without any intervening use of the "−1,0" state. Similarly, a high-to-low transition in signal "telmin" is encoded as two uses of the "−1,0" state in data signal Tx without any intervening use of the "+1,0" state. Steadily alternating between using the "+1,0" state to represent a 1 in signal "input" and using the "−1,0" state to represent a 1 in signal "input", indicates no transition in signal "telmin" and a bit in signal "morl" of value 0.

In the exemplary encoding process, a bit value of 1 for signal "morl" is encoded using three consecutive "+1,0" states (or three consecutive "−1,0" states) in data signal Tx without any intervening use of the "−1,0" state (or "+1,0" state). Two of the consecutive states can correspond to the same states that were used to encode a transition in signal "telmin". In such a case, the bit rate of "morl" is slower that the bit rate of signal "telmin" which is slower than the bit rate of signal "input". A bit value of signal "morl" is 0 if two consecutive "−1,0" states are followed by a "+1,0" state or if two consecutive "+1,0" states are followed by a "−1,0" state.

Figure 4:
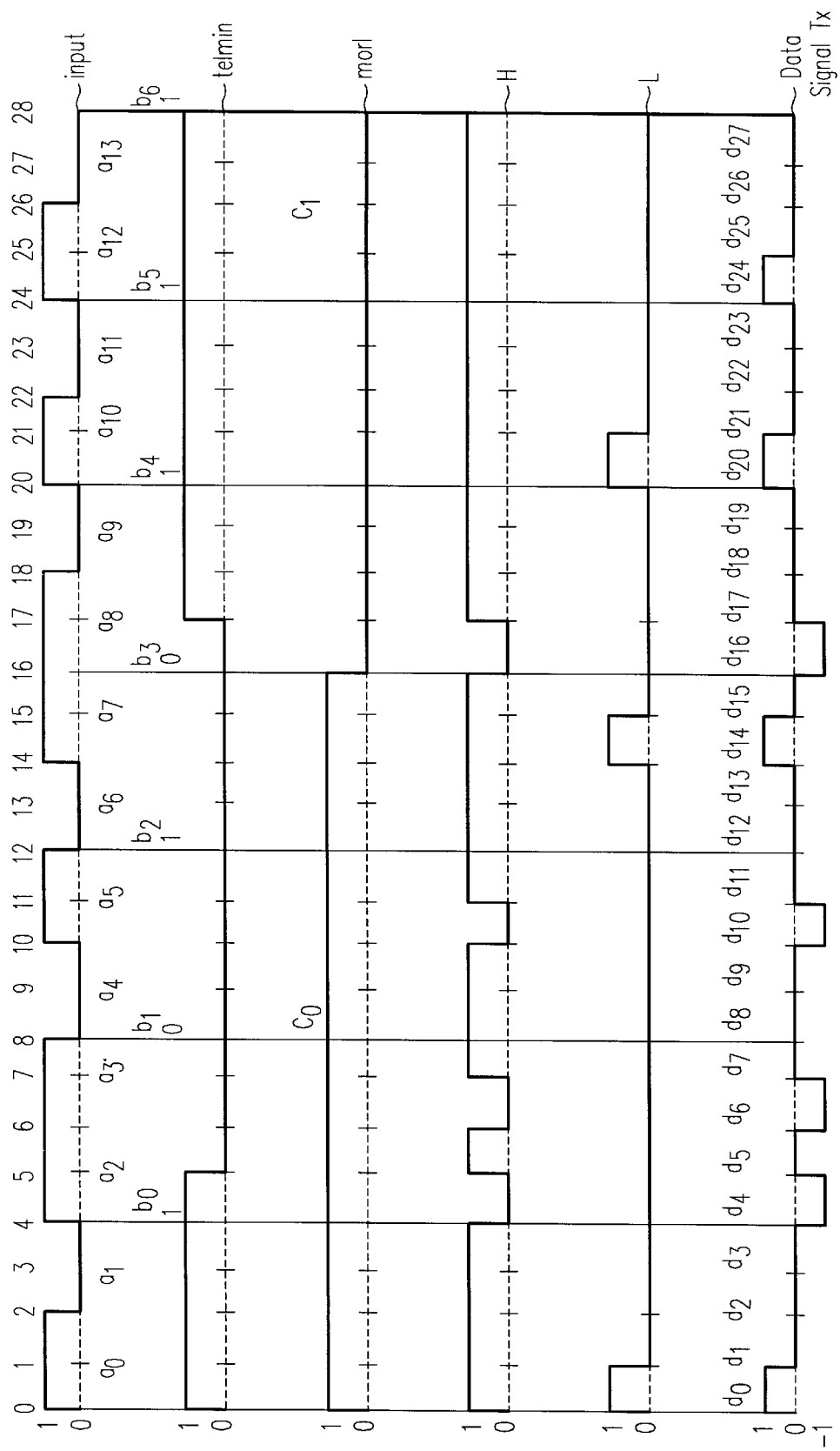
FIG. 4 shows signals associated with an encoding process in accordance with one embodiment of the invention.

FIG. 4 shows the three input signals, "input", "telmin", and "morl", and other signals associated with the encoding process in accordance with one embodiment of the invention. Encoder 300 generates internal signals H and L from signals "input", "telmin", and "morl" according to the software entity "TOGGLE4" illustrated in FIGS. 12, 13, and 14. A "+1" state is provided in data signal Tx when both signals H and L represent 1's. A "0" state is provided in data signal Tx when signal H represents a 1 and signal L represents a 0. A "−1" state is provided in data signal Tx when signals H and L both represent 0's. There are no situations in which the software entity TOGGLE 4 allows signal H to represent 0 and signal L to represent 1.

Figure 5:
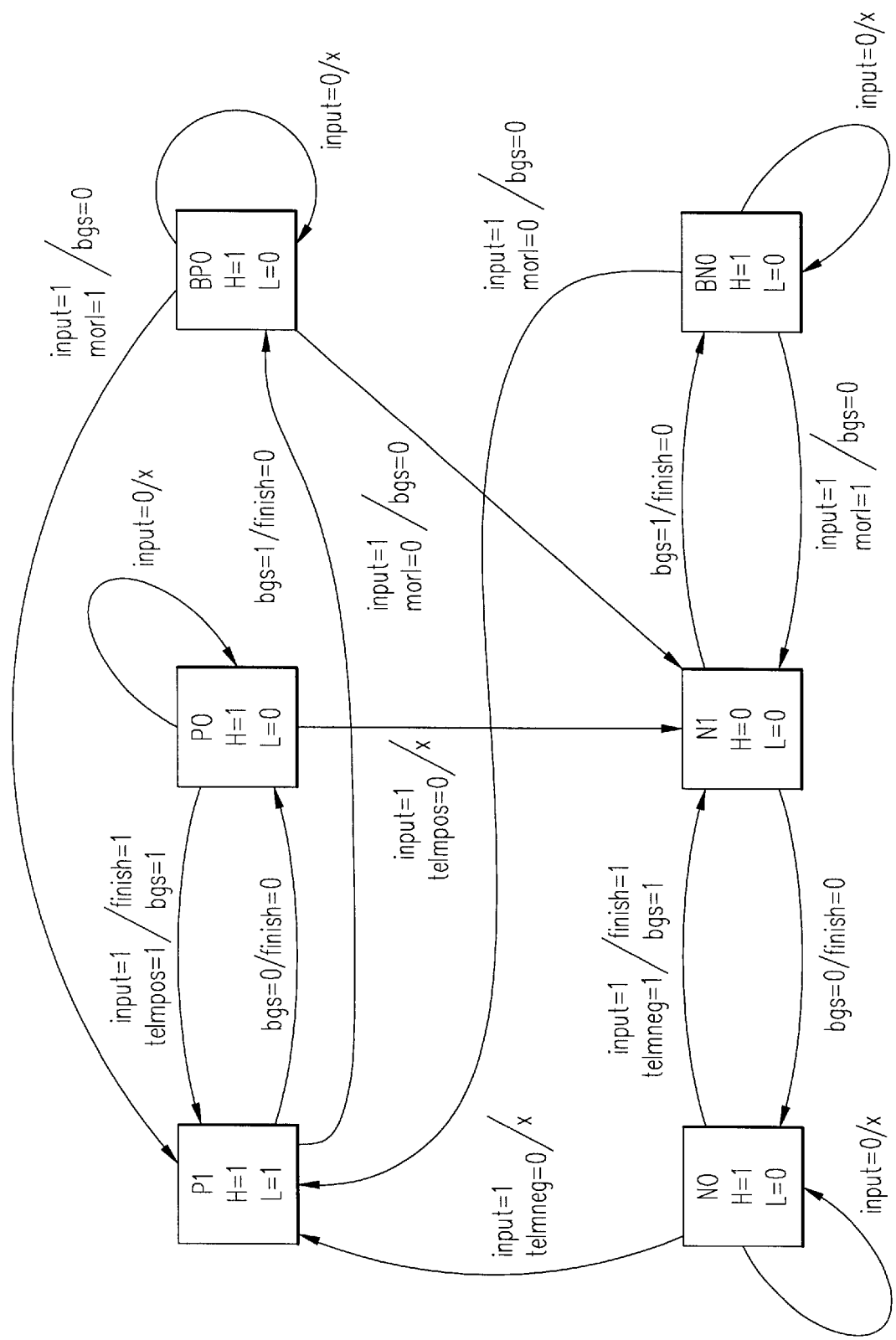
FIG. 5 shows a flow chart of an encoding process in accordance with one embodiment of the invention.

FIG. 5 shows a state diagram of an encoding process in accordance with the invention. Six encoding states are provided: P1, P0, BP0, N0, N1, and BN0. In the exemplary encoding process, states P1 and N1 indicates a "+1" state and a "−1" state, respectively, in data signal Tx. State P1 sets both signals H and L to 1. State N1 sets both signals H and L to 0. States P0, BP0, N0, and BNO sets signal H to 1 and signal L to 0. Being in state P0 indicates that the previous non-"0" state was a "+1" state (i.e., state P1) and the non-"0" state before that was the "−1" state. State N0 indicates that the previous non-"0" state was the "−1" state (i.e., state N1) and the previous non-"0" state before that was the "+1" state. State BP0 indicates that the previous two non-"0" state were both state "+1" states. State BNO indicates that the previous two non-ground states were both "−1" states.

The arrows connecting the six states of FIG. 5 indicate state transitions. For each arrow, the conditions for making the transition are provided to the left of an associated diagonal line (e.g., state N1 changes to state N0 if bit "bgs" is 0). The text to the right of the diagonal line shows any changes to other signals or flags as a result of the change in state.

A flag "telmpos" is set to 1 when a positive transition in flag "telmtry" needs to be encoded. This need is determined by, for example, comparing signal "telmin" provided to the encoder with a tracking signal "telmtry" which tracks the portion of the signal "telmin" which has already been encoded. If signal "telmin" is 1 and signal "telmtry" is 0, a low-to-high transition is needed and flag "telmpos" is set to 1. A flag "telmneg" being set to 1 means a negative transition in "telmtry" needs to be encoded. This need is also detected by comparing signal "telmin" to signal "telmtry".

A flag "bgs" indicates whether a telemetry transition has just been encoded so that a bit from signal "morl" can now be encoded. A bit in signal "morl" having a value 1 may represent a synchronization signal, for example. Resetting a flag "finish" resets flags "telmpos" and "telmneg" to zero after the appropriate signal "telmtry" transition has been encoded (i.e., a signal "telmtry" transition does not need to be encoded anymore because signal "telmtry" has changed to signal "telmin" already).

It will be understood to one skilled in the art that the flow chart of FIG. 5 has no predetermined starting point. For this description, the starting parameters are assumed to be as follows:

1) the state just prior to time 0 was state N0,
2) a signal "telmtry" transition does not need to be encoded (i.e., flags "telmpos" and "telmneg"=0), and
3) a "telmtry" transition had not just been encoded (i.e., "bgs"=0).

The encoding illustrated in FIG. 4 is now described in conjunction with FIG. 5. From time 0 to time 5, there is no transition in signal "telmin" and thus data signal Tx has regular AMI format.

At time 0, flag "bgs" is set to 0, and signal "input" (bit a0) has value 1. Thus the encoding state transitions from state N0 to state P1. Being in state P1 means the signals "H" and "L" both have value 1 at time 0. Signals "H" and "L" both being 1 causes the data signal Tx to have value 1 at time 0.

At time 1, flag "bgs" is still 0. Thus the encoding state transitions from state P1 to state P0 causing signal "H" to have value 1 and signal "L" to have value "0". This causes data signal Tx to transition to the "0" state at time 1.

At time 2, signal "input" (bit a1) is 0, and thus the encoding state remains state P0 (data signal Tx remains at the "0" state).

At time 3, signal "input" (bit a1) is still 0, and thus the encoding state remains P0 (data signal Tx remains at the "0" state.

At time 4, signal "input" (bit a2) has value 1, but flag "telmpos" is set to 0. Thus the encoding state transitions from state P0 to state N1 and data signal Tx transitions to the "−1" state. From time 0 to 5, flags "telmpos" and "telmneg" remain unset because there are no transitions in signal "telmin". Flags "bgs" and "finish" retain their initial values, 0.

At time 5, encoder 300 detects a negative transition in signal "telmin" and sets flag "telmneg" to 1. Since flag "bgs" is set to 0, the encoding state transitions from state N1 to state N0, and data signal Tx transitions to the "0" state.

At time 6, signal "input" (bit a3) has value 1, and flag "telmneg" is set to 1. Thus the encoding state transitions from state N0 back to state N1. Flags "finish" and "bgs" are set to 1 at time 6 because a negative transition in "telmin" is encoded (two consecutive "−1" states represented by d4 and d6 uninterrupted by a "+1" state are present in data signal Tx). Flag "bgs" is set to 1 indicating that the encoder 300 is ready to encode a "morl" bit.

At time 7, flag "bgs" is 1. Thus, the encoding state transitions from state N1 to state BN0 (data signal Tx transitions to the "0" state). Flag "finish" is reset to 0 because the previous flag "finish" value of 1 caused the "telmneg" bit to be reset to 0 before the change to state BN0.

At times 8 and 9, signal "input" (bit a4) has value 0, and thus the encoding state remains BN0 (data signal Tx has a "0" state).

At time 10, signal "input" (bit a5) has value 1, and signal "morl" has value 1. Thus the encoding state transitions from state BN0 to N1. Data signal Tx transitions to the "−1" state, and flag "bgs" is reset to 0. Thus, a positive "morl" bit is encoded at time 10 by three consecutive N1 states represented in data signal Tx by three negative pulses d4, d6 and d10 uninterrupted by a positive pulse.

At time 11, flag "bgs" is 0. Thus the encoding state transitions from state N1 to state N0 and data signal Tx transitions to the "0" state.

At time 12 and 13, signal "input" (bit a6) has value 0, and the encoding state remains state N0.

At time 14, signal "input" (bit a7) has value 1, and flag "telmneg" is 0. Thus the encoding state transitions from state N0 to state P1 and data signal Tx transitions to the "+1" state.

At time 15, flag "bgs" is 0. Thus, the encoding state transitions from state P1 to state P0 and data signal Tx transitions to the "0" state.

At time 16, signal "input" (bit a8) has value 1 and flag "telmpos" is 0. Thus, the encoding state transitions from state P0 to N1 and data signal Tx transitions to the "−1" state.

At time 17, encoder 300 detects a positive transition in signal "telmin", and flag "telmpos" is set to 1. Since flag "bgs" is 0, the encoding state transitions from state N1 to N0 and data signal Tx transitions to the "0" state.

At times 18 and 19, signal "input" (bit a9) has value 0, and thus the encoding state remains state N0.

At time 20, signal "input" (bit a10) has value 1, and flag "telmneg" is 0. Thus, the encoding state transitions from state N0 to state P1, and data signal Tx transitions to the "+1" state.

At time 21, flag "bgs" is 0. Thus, the encoding state transitions from state P1 to state P0, and data signal Tx transitions to the "0" state.

At times 22 and 23, signal "input" (bit a11) has value 0, and thus the encoding state remains state P0.

At time 24, signal "input" is 1, and flag "telmpos" is 1. Thus, the encoding state transitions to state P1, and data signal Tx transitions back to the "+1" state. At time 24, the positive transition in the telmin signal is encoded by two consecutive "+1" states represented by positive pulses d20 and d24 uninterrupted by a "−1"state.

At time 25, flag "bgs" is 0. Thus, the encoding state transitions from state P1 to P0 and data signal Tx transitions to the "0" state.

At times 26 and 27, signal "input" has value 0. Thus, the encoding state remains P0.

As described above, data signal Tx represents all the bits a0 to a13 of signal "input", all the transitions of signal "telmin", and the bit c0 of signal "morl".

Figure 6:
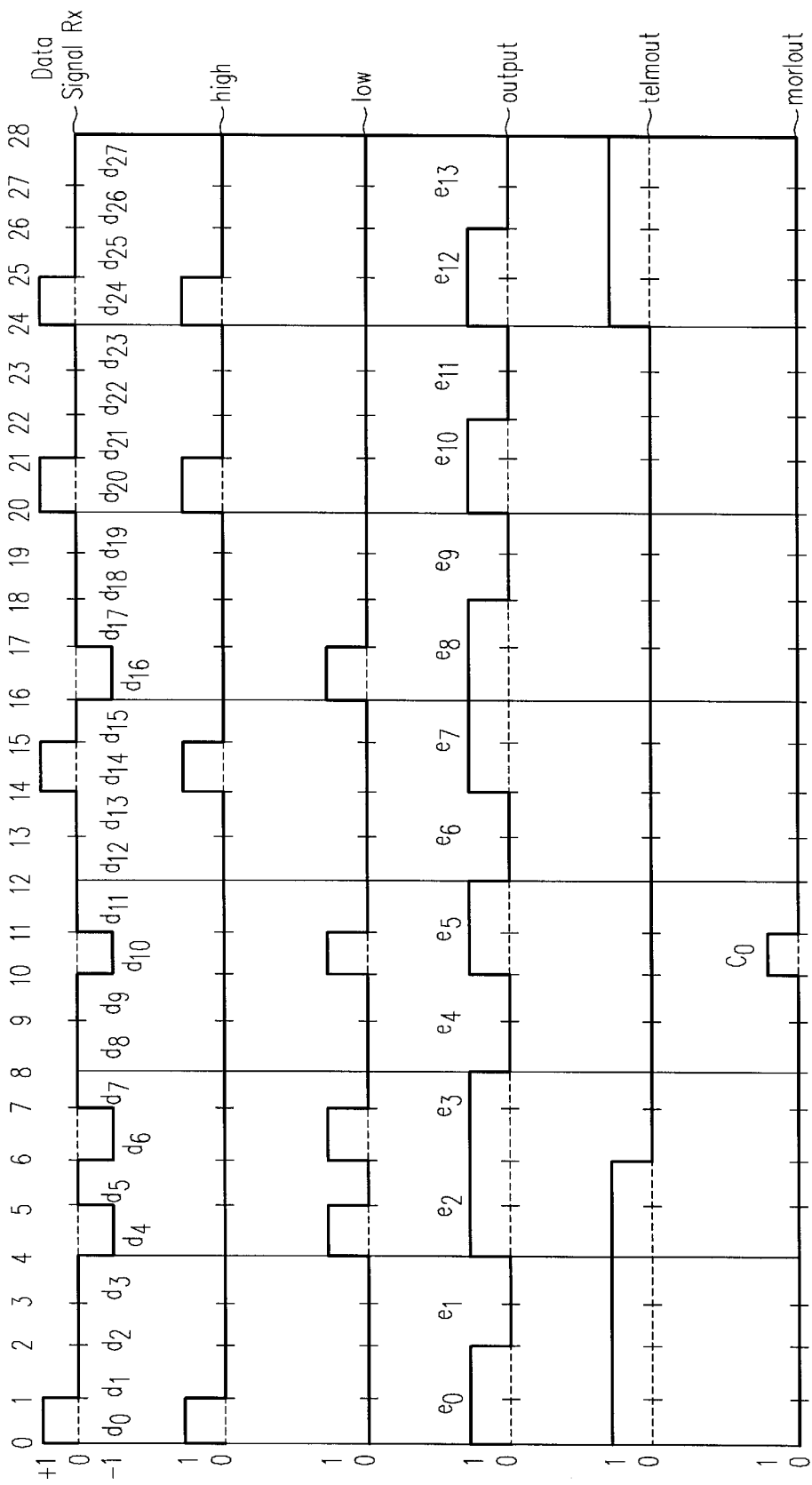
FIG. 6 shows signals associated with a decoding process in accordance with one embodiment of the invention.
Figure 7:
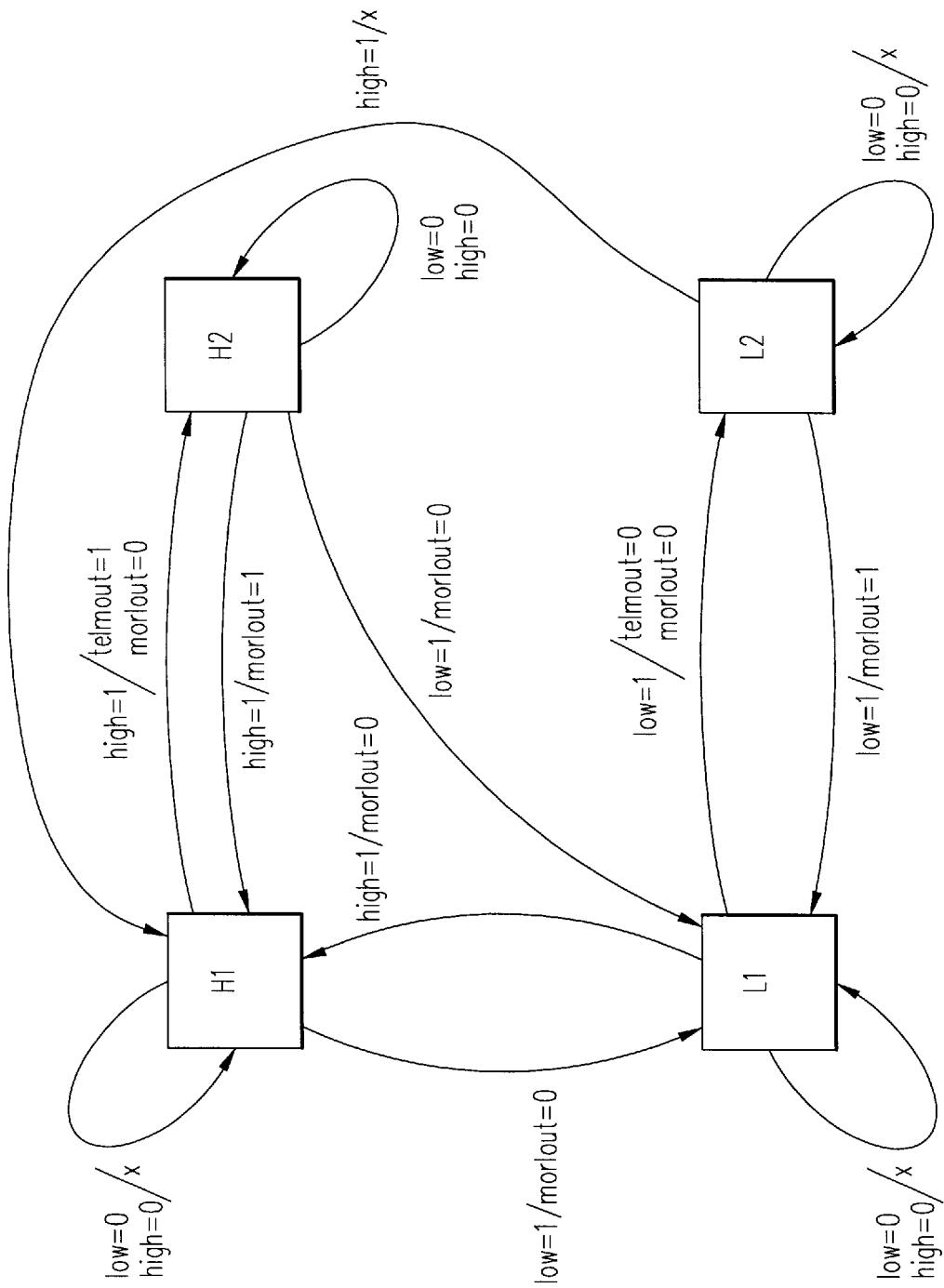
FIG. 7 shows a flow chart of a decoding process in accordance with one embodiment of the invention.
Figure 8A:
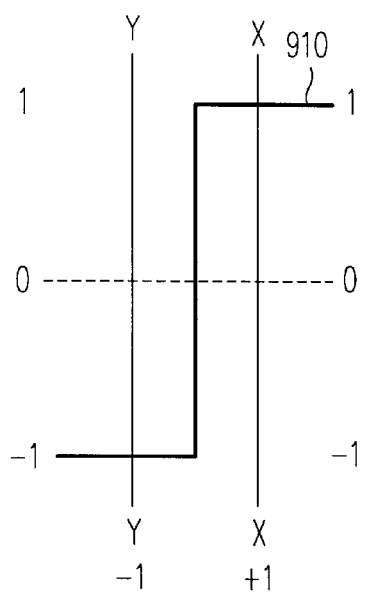
FIGS. 8A, 8B, 8C, and 8D show four signals that illustrate an encoding process according to one embodiment of the invention.
Figure 8B:
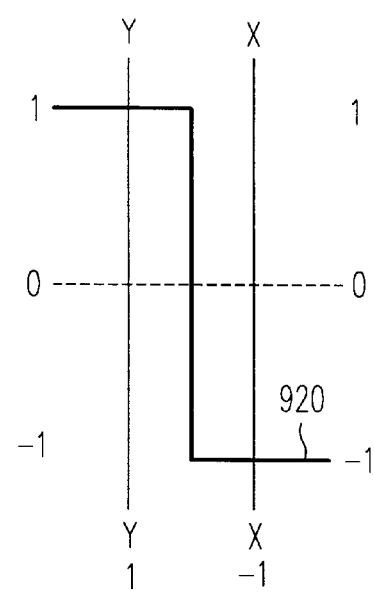
Figure 8C:
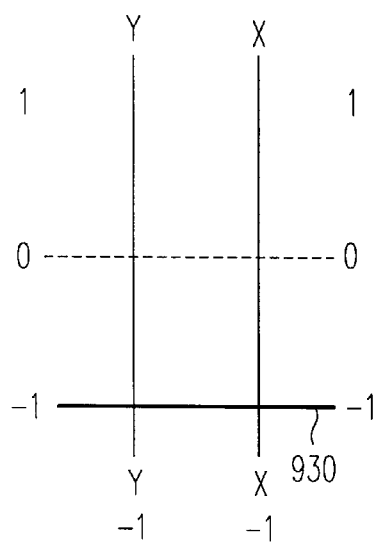
Figure 8D:
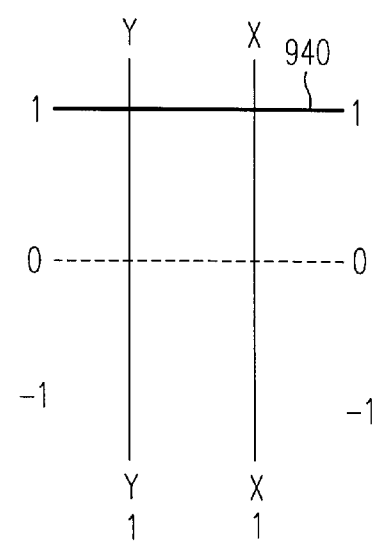
Figure 9A:
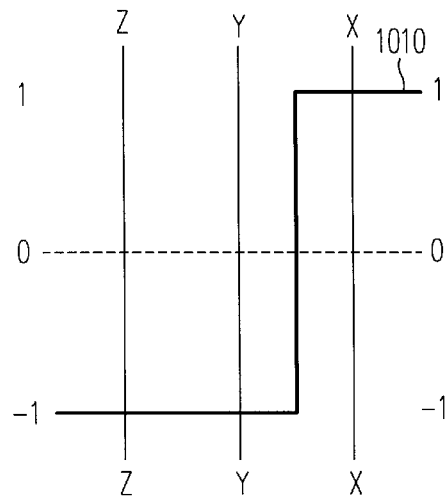
FIG. 9A, 9B, 9C, 9D, 9E, and 9F show six signals that illustrate an encoding process according to one embodiment of the invention.
Figure 9B:
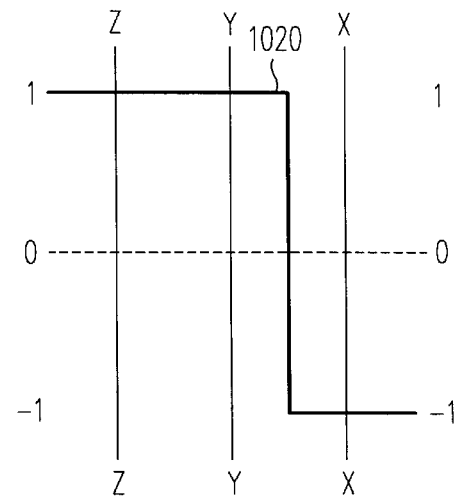
Figure 9C:
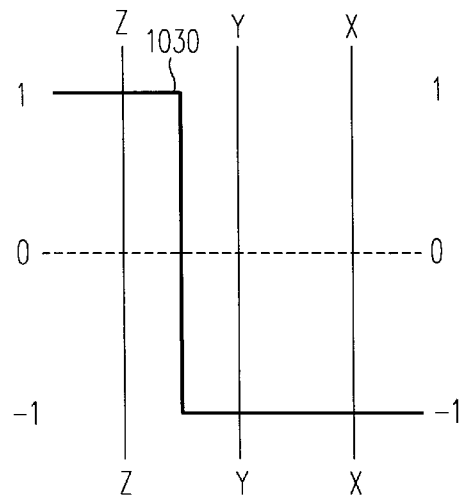
Figure 9D:
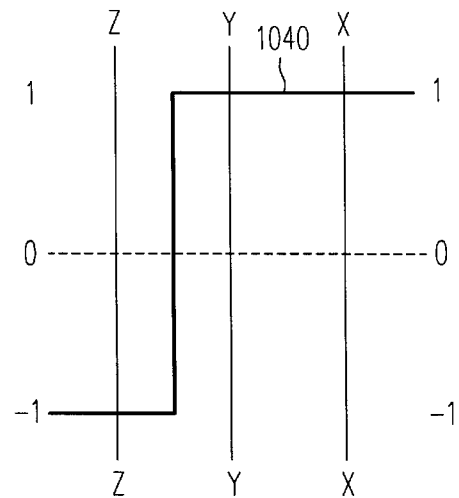
Figure 9E:
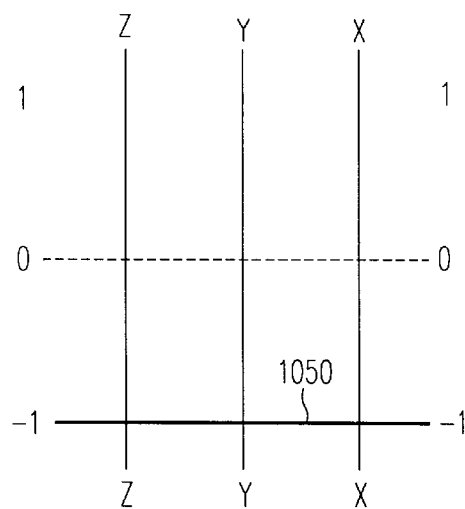
Figure 9F:
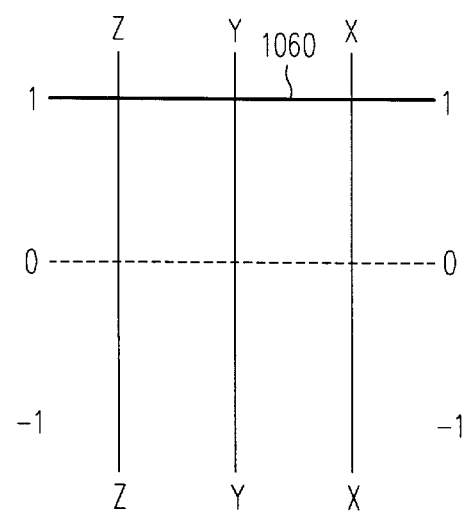

FIG. 6 illustrates timing of data signal Rx (corresponding to the transmitted data signal Tx) that decoder 400 receives, other signals "high" and "low" associated with the decoding process, and the decoded signals "output", "telmout", and "morlout". FIG. 7 shows a state diagram for an exemplary decoding process corresponding to the above described exemplary encoding process. The decoding process involves decoding states H1, H2, L1, and L2. FIGS. 15 and 16 show a listing of corresponding decoding software entity "TGD-ECD4".

Decoder 400 provides signal "output", corresponding to the signal "input", by assigning a 1 to each bit of signal "output" (i.e., bits e0, e2, e3, e5, e7, e8, e10 and e12) which corresponds to "+1" or "−1" states in data signal Rx (i.e., state d0, d4, d6, d10, d14, d16, d20 and d24). Decoder 400 assigns a 0 to each bit of signal "output" (i.e., bits e1, e4, e6, e9, e11 and e13) which corresponds to no "+1" or "−1" states in data signal Rx (i.e., the corresponding bit period of the data signal Rx is grounded). For example, bit e0 is 1 because at least one of states d0 and d1 is a "+1" state. Bit e1 is a 0 because neither state d2 nor d3 is a "+1" or "−1" state.

Decoder 400 also generates signals "telmout" and "morlout" corresponding to respective signals "telmin" and "morl". This exemplary decoding process is described with reference to FIG. 6 and FIG. 7. In order to be compatible with the starting parameters of the exemplary encoding process described above, the starting parameters are assumed to be as follows:

1) L1 is the decoding state just prior to time 0, and
2) a "telmout" signal starts with a value 1.

Decoder 400 detects signal Rx and assigns a 1 to signal "high" only if data signal Rx has a "+1" state, and assigns a 1 to signal "low" only if data signal Rx has a "−1" state.

At time 0, the state d0 of the data signal Rx is the "+1" state (i.e., signal "high" is 1) and thus the decoding state transitions to state H1.

At times 1, 2 and 3, the states d1, d2 and d3 of the data signal Rx are a "0" state and thus the decoding state remains H1. Note that there is never a transition in the decoding state when signals "high" and "low" are both "0" states.

At time 4, the state d4 of the data signal Rx is the "−1" state (i.e., signal "low" is 1) and thus the decoding state transitions to state L1. Mere transitions from state L1 to H1 and from H1 to L1 indicate that there is no transition in the signal "telmout" and no morl bit in signal "morl" to be decoded.

At time 5, the state d5 of the data signal Rx is the "0" state and thus the decoding state remains L1.

At time 6, the state d6 of the data signal Rx is the "−1" state (signal "low" is 1) and thus the decoding state transitions to state L2. Signal "telmout" transitions to the 0 state and thus a negative transition of the telemetry signal is decoded. Signal "morlout" remains 0.

At times 7, 8 and 9, the states d7, d8 and d9 are the "0" state and thus the decoding state remains state L2.

At time 10, the signal Rx is the "−1" state. Thus, signal "low" is 1. The decoding state transitions to state L1, and a 1 value is asserted on signal "morl". Thus, the morl bit c0 is decoded. The signal "morl" is only temporarily asserted with a "+1" state and thus it is morl bits that are encoded and decoded, and not just the transitions as with signal "telmin".

At times 11, 12 and 13, the states d11, d12 and d13 are the "0" state and thus the decoding state remains state L1.

At time 14, the state d14 of signal Rx is the "+1" state, and thus the decoding state transition to state H1.

At time 15, the state d15 is the "0" state, and thus the decoding state remains state H1.

At time 16, the state d16 is the "−1" state, and thus the decoding state transitions to L1.

At times 17, 18 and 19, the states d17, d18 and d19 are the "0" state, and the decoding state remains state L1.

At time 20, the state d20 is the "+1" state, and the decoding state transitions to state H1.

At times 21, 22 and 23, states d21, d22 and d23 are the "0" state, and the decoding state remains H1.

At time 24, the state d24 is the "+1" state and thus the decoding state transitions to state H2. Also, the signal "telmout" transitions high. Thus, a positive transition in the signal telmin has been decoded.

At times 25, 26 and 27, states d25, d26 and d27 are the "0" state, and the decoding state remains H2.

Therefore, the first embodiment provides a method and structure for encoding several signals ("input", "telmin", and "morl") into one signal (data signal Tx) and decoding the received signal (data signal Rx) into three corresponding signals ("output", "telmout", and "morlout").

Sometimes, signal "input" may contain data that has numerous consecutive binary 0's. The above encoding method relies on a sufficient density of binary 1's in signal "input" in order to encode signals "telmin" and "morl". To ensure a suitable density of 1's, the data stream for signal "input" can be scrambled using, for example, a $2^{15}-1$ scrambler. The scramble signal "input" is recovered as signal "output". Signal "output" is then descrambled to obtain the original data.

In one embodiment, signal "input" is data to be provided from an ODU to an IDU in a portion of a radio network and signals "telmin" and "morl" are lower bit rate peek link data (e.g., telemetry, most significant bit, least significant bit, or control data).

In the exemplary encoding process described above, state P1 represented a positive state, state N1 represented a negative state, and states N0, P0, BN0, and BP0 all represented a ground state. However, states P1 and N1 can be any discrete state distinguishable from each other and distinguishable from the state of N0, P0, BN0, and BP0. Furthermore, states N0, P0, BN0, and BP0 can be a discrete state other than a ground voltage state as long as the discrete state is distinguishable from that of state P1 and N1.

In the exemplary encoding process described above, signal "morlout" is described as being, by default, a 0 except for a small portion of time immediately following the decoders 400 determination that "morlout" is 1. However, signal "morl" could be encoded by encoding transitions in a similar manner as the transitions of "telmin" are encoded. For example, a positive transition in signal "morl" could be encoded by three consecutive positive states of three consecutive negative states. A negative transition could be encoded by a negative state following two consecutive positive states or by a positive state following two consecutive negative states.

In the above exemplary encoding process, a specific order of positive and negative states is used to encode transitions in signal "telmin" and to encode "morl" bits. However, other orders of positive and negative states may be used to encode transitions and bits. For example, a negative state followed by a positive state could represent a positive transition in "telmin". Furthermore, more than three signals can be encoded using the principles of the invention. For example, low-to-high transitions in a fourth, fifth, sixth, and seventh signals could be represented by four, five, six, and seven consecutive positive states uninterrupted by a negative state. Furthermore, bits could be encoded instead of transitions. For example, a fourth and fifth bit could be encoded using four and five consecutive positive states. A fifth bit may alternatively be encoded using four negative one states.

A second embodiment of the invention is described as follows with reference to FIGS. 8a, 8b, 8c, and 8d which show respective signals 910, 920, 920, and 940. Each signal 910, 920, 930, and 940 is associated with two decorder 400 sample times X and Y.

Table 1 shows how decoder 400 interprets signals 910, 920, 930, and 940 as follows.

TABLE 1

| Signal | Value at sample time X | Value at sample time Y | Decoder 400 interpretation |
|---|---|---|---|
| 910 | +1 | −1 | the next bit of signal "output" is a binary zero |
| 920 | −1 | +1 | the next bit of signal "output" is a binary one |
| 930 | −1 | −1 | the next bit of signal "telmout" is a binary zero |
| 940 | +1 | +1 | the next bit of signal "telmout" is a binary one |

Encoder 300 encodes a binary 0 and 1 of signal "input" by transmitting signals 910 and 920, respectively. Encoder 300 encodes a binary 0 and 1 of "telmin" by transmitting signals 930 and 940, respectively.

A third embodiment of the invention is described as follows with reference to FIGS. 9A, 9B, 9C, 9D, 9E, and 9F which show signals 1010, 1020, 1030, 1040, 1050, and 1060 which are associated with three decoder 400 sample times X, Y, and Z.

In this embodiment, signals "input", "telmin", and "morl" are encoded. Table two shows how decoder 400 interprets signals 1010, 1020, 1030, 1040, 1050, and 1060 as follows.

TABLE 2

| Signal | Value at sample time X | Value at sample time Y | Value at sample time Z | Decoder 400 interpretation |
|---|---|---|---|---|
| 1010 | +1 | −1 | −1 | the next bit of signal "output" is a binary zero |
| 1020 | −1 | +1 | +1 | the next bit of signal "output" is a binary one |
| 1030 | −1 | −1 | +1 | the next bit of signal "telmout" is a binary zero |
| 1040 | +1 | +1 | −1 | the next bit of signal "telmout" is a binary one |
| 1050 | −1 | −1 | −1 | the next bit of signal "morlout" is a binary zero |
| 1060 | +1 | +1 | +1 | the next bit of signal "morlout" is a binary one |

Encoder 300 encodes a binary 0 and 1 of signal "input" by transmitting signals 1010 and 1020, respectively. Encoder 300 encodes a binary 0 and 1 of signal "telmin" by transmitting signals 1030 and 1040, respectively. Encoder 300 encodes a binary 0 and 1 of signal "morl" by transmitting signals 1050 and 1060, respectively.

The above describes signals d, "input", "output", 910, 920, 930, 940, 1010, 1020, 1030, 1040, 1050, and 1060 as having "+1", "0", and "−1" states corresponding respectively to a positive voltage state, a ground voltage state, and a negative voltage state. However, the voltage magnitude and polarity does not matter as long as they are different and distinguishable as separate states by decoder 400.

Figure 10:
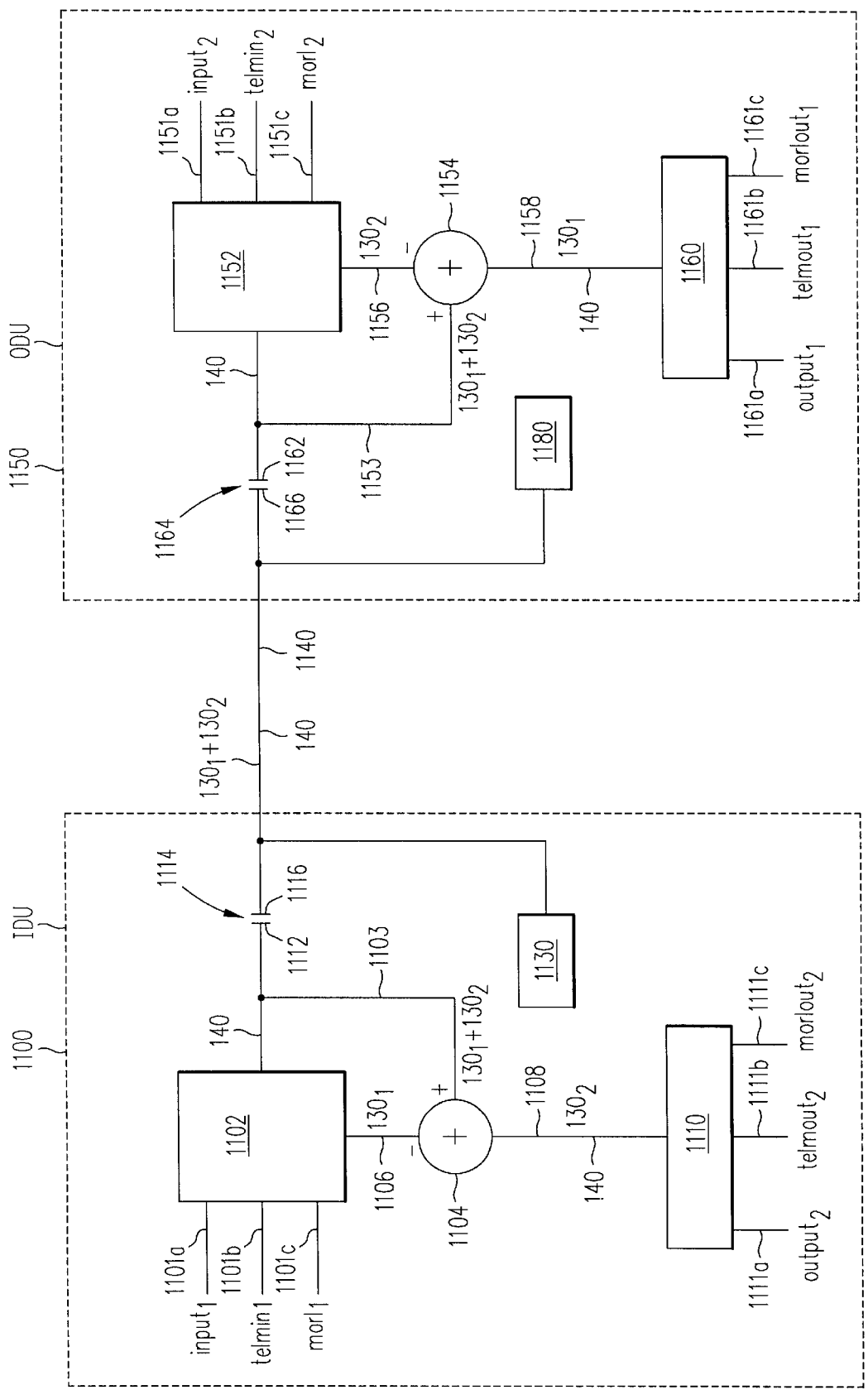
FIG. 10 shows a network for implementing the processes and systems described above in duplex mode (bi-directionally).

FIG. 10 shows a specific network for implementing the processes and systems described above bi-directionally. IDU 1100 and ODU 1150 each contain a respective encoder 1102 and 1152 (each corresponding to encoder 300), an adder 1104 and 1154, and a decoder 1110 and 1160 (each corresponding to decoder 400). IDU 1100 has a line 1106 connecting encoder 1102 to the negative input terminal of adder 1104 and a line 1108 connecting decoder 1110 to the output terminal of adder 1104. ODU 1150 has a line 1156 connecting encoder 1152 to the negative input terminal of adder 1154 and a line 1158 connecting decoder 1160 to the result terminal of adder 1154.

Medium 140 connects encoder 1102 to the positive input terminal of adder 1104 with conductor 1103 and connects encoder 1152 to the positive input terminal of adder 1154 with conductor 1153. Conductor 1103 connects encoder 1102 to one terminal 1112 of capacitor 1114 while connector 1153 connects encoder 1152 to one terminal 1162 or capacitor 1164. A second terminal 1116 of capacitor 1114 is connected to a second terminal 1166 of capacitor 1164 with a central portion 1140 of medium 140.

For transmissions from IDU 1100 to ODU 1150, encoder 1102 acts as encoder 300 and decoder 1160 acts as decoder 400. For transmission from ODU 1150 to IDU 1100, encoder 1152 acts as encoder 300 and decoder 1110 acts as decoder 400.

Encoder 1102 receives and encodes signals "$input_1$" "$telmin_1$", and "$morl_1$" and asserts resultant data signal $130_1$ on conductor 1103 of medium 140 according to the encoding process described above. Encoder 1152 receives and encodes signals "$input_2$", "$telmin_2$", and "$morl_2$" and asserts resultant data signal $130_2$ on conductor 1153 of medium 140 according to the encoding process described above.

Both resultant signals $130_1$ and $130_2$ are transmitted through central portion 1140 and conductors 1103 and 1153. Therefore, central portion 1140 and conductors 1103 and 1153 carry signals $130_1$ and $130_2$ added together ($130_1$+$130_2$). Signal $130_1$ is a negative input signal and signal $130_1$+$130_2$ is a positive input signal to adder 1106 resulting in adder 1106 asserting signal $130_2$ on line 1108. Signal $130_2$ is a negative input signal and signal $130_1$+$130_2$ is a positive input signal to adder 1158 resulting in adder 1154 asserting signal $130_1$ on line 1158. Therefore, bi-directional transfer of signals encoded by the above processes is enabled. Decoders 1110 and 1160 receive signals $130_2$ and $130_1$, respectively, and decode signals "$output_2$", "$telmin_2$", and "$morl_2$" and signals "$input_1$", "$telmin_1$", and "$morl_1$", respectively, according to the one of the decoding processes described above.

FIG. 10 also shows that IDU 1100 has a dc power source 1130 connected to central portion 1140 and that ODU 1150 has a dc power load 1180 connected to central portion 1140. Therefore, DC power is transferable from IDU 1100 to ODU 1150 over medium 140 by flowing charge carriers from dc power source 1130 through central portion 1140 and into dc power load 1180. Of course, there will be some fluctuations in the dc power on central portion 1140 because of alternating current caused by signals $130_1$ and $130_2$. However, these power fluctuations are high frequency because of the relatively high frequency of signals $130_1$ and $130_2$. Furthermore, the average dc power of signals $130_1$ and $130_2$ is zero. Therefore, the fluctuations are not felt by power load 1180 which is not sensitive to high frequency dc power fluctuations of the magnitude cause by signals $130_1$ and $130_2$.

Figure 11:
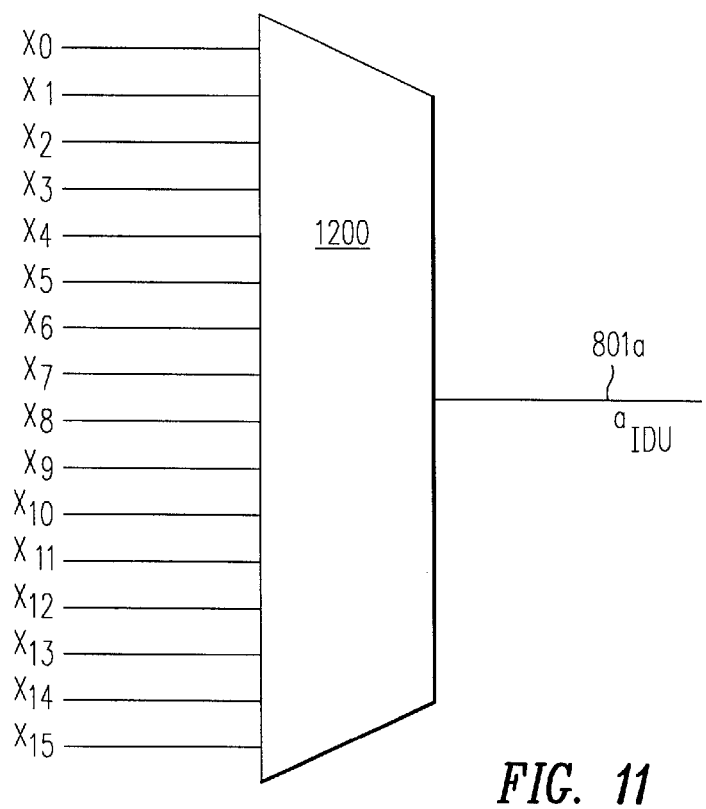
FIG. 11 shows a multiplexer that forms a signal "$input_1$") of FIG. 10.

FIG. 11 shows a multiplexer 1200 used to form signal "input$_1$" of FIG. 10. Multiplexer 1200 receives its inputs from lines x0, x1, x2, x3, x4, x5, x6, x7, x8, x9, x10, x11, x12, x13, x14, and x15 and provides a resulting signal "input$_1$" on line 1101a. A similar multiplexer 900 is provided in ODU 1150. Therefore, signals "input$_1$" and "input$_2$" may contain data from different channels which are time multiplexed.

Therefore, a system which uses the above encoding processes and which enables bi-directional information flow and dc power transfer is enabled.

FIGS. 17–20 are flow diagrams illustrating a technique of the invention. One skilled in the art would recognize that the flow diagrams illustrate processing flow in one embodiment of the invention, but the processes may be ordered differently in other embodiments.

Figure 17:
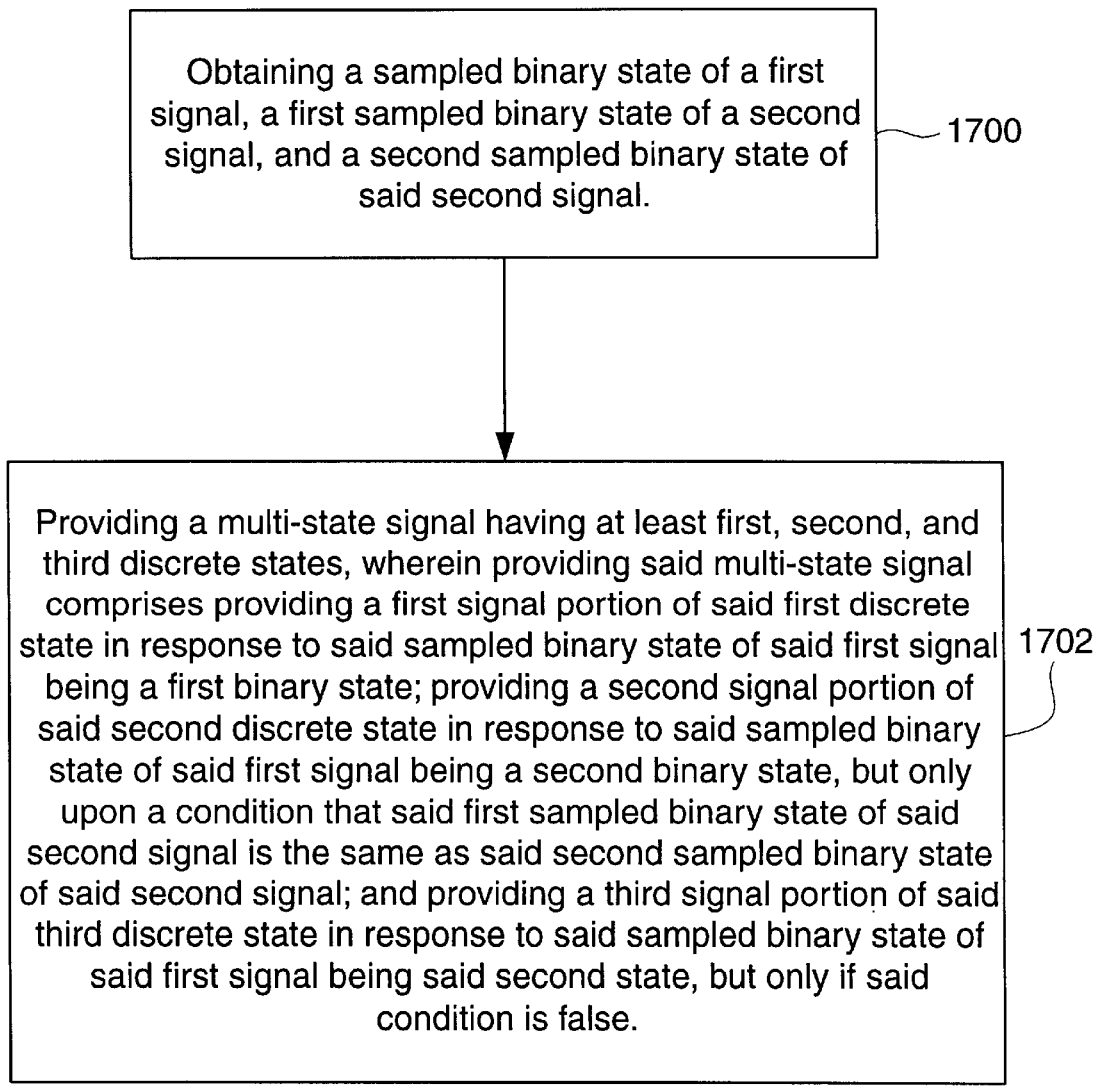

In FIG. 17, Block 1700 represents obtaining a sampled binary state of a first signal, a first sampled binary state of a second signal, and a second sampled binary state of said second signal. Block 1702 represents providing a multi-state signal having at least first, second, and third discrete states, wherein providing said multi-state signal comprises providing a first signal portion of said first discrete state in response to said sampled binary state of said first signal being a first binary state; providing a second signal portion of said second discrete state in response to said sampled binary state of said first signal being a second binary state, but only upon a condition that said first sampled binary state of said second signal is the same as said second sampled binary state of said second signal; and providing a third signal portion of said third discrete state in response to said sampled binary state of said first signal being said second state, but only if said condition is false.

Figure 18:
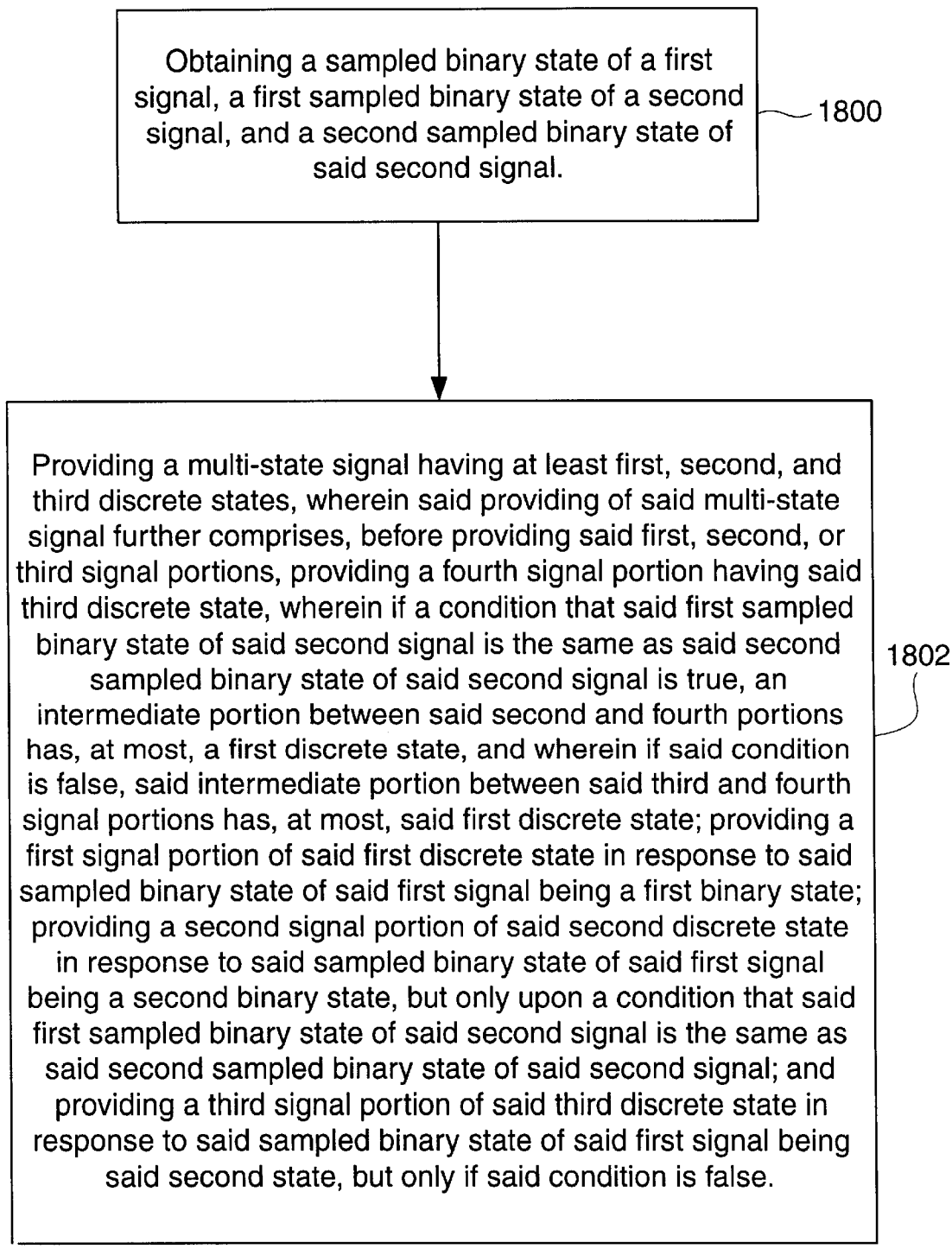

In FIG. 18, Block 1800 represents obtaining a sampled binary state of a first signal, a first sampled binary state of a second signal, and a second sampled binary state of said second signal. Block 1802 represents providing a multi-state signal having at least first, second, and third discrete states, wherein said providing of said multi-state signal further comprises, before providing said first, second, or third signal portions, providing a fourth signal portion having said third discrete state, wherein if a condition that said first sampled binary state of said second signal is the same as said second sampled binary state of said second signal is true, an intermediate portion between said second and fourth portions has, at most, a first discrete state, and wherein if said condition is false, said intermediate portion between said third and fourth signal portions has, at most, said first discrete state; providing a first signal portion of said first discrete state in response to said sampled binary state of said first signal being a first binary state; providing a second signal portion of said second discrete state in response to said sampled binary state of said first signal being a second binary state, but only upon a condition that said first sampled binary state of said second signal is the same as said second sampled binary state of said second signal; and providing a third signal portion of said third discrete state in response to said sampled binary state of said first signal being said second state, but only if said condition is false.

In FIG. 19, Block 1900 represents obtaining a sampled binary state of a first signal, a first sampled binary state of a second signal, and a second sampled binary state of said second signal. Block 1902 represents providing a multi-state signal having at least said first, second, and third discrete states, wherein said providing of said multi-state signal further comprises, before providing said first, second, or third signal portions, providing a fourth signal portion having said second discrete state, wherein if a condition that said first sampled binary state of said second signal is the same as said second sampled binary state of said second signal is true, an intermediate portion between said second and fourth portions has, at most, a first discrete state, and wherein if said condition is false, said intermediate portion between said third and fourth signal portions has, at most, said first discrete state; providing a first signal portion of said first discrete state in response to said sampled binary state of said first signal being a first binary state; providing a second signal portion of said second discrete state in response to said sampled binary state of said first signal being a second binary state, but only upon a condition that said first sampled binary state of said second signal is the same as said second sampled binary state of said second signal; and providing a third signal portion of said third discrete state in response to said sampled binary state of said first signal being said second state, but only if said condition is false.

Figure 20:
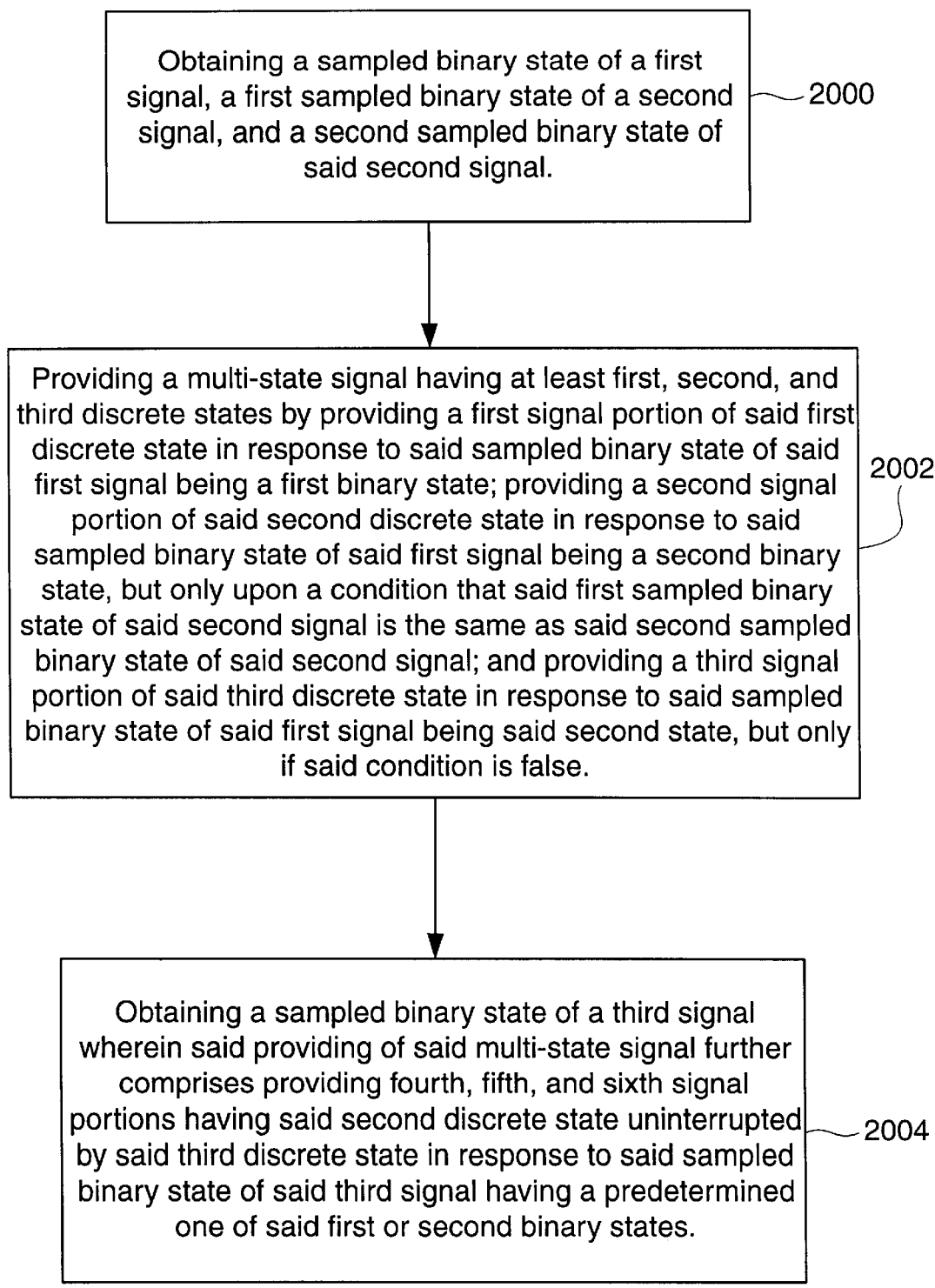

In FIG. 20, Block 2000 represents obtaining a sampled binary state of a first signal, a first sampled binary state of a second signal, and a second sampled binary state of said second signal. Block 2002 represents providing a multi-state signal having at least first, second, and third discrete states, wherein providing said multi-state signal comprises, providing a first signal portion of said first discrete state in response to said sampled binary state of said first signal being a first binary state, providing a second signal portion of said second discrete state in response to said sampled binary state of said first signal being a second binary state, but only upon a condition that said first sampled binary state of said second signal is the same as said second sampled binary state of said second signal, and providing a third signal portion of said third discrete state in response to said sampled binary state of said first signal being said second state, but only if said condition is false. Block 2004 represents obtaining a sampled binary state of a third signal, wherein said providing of said multi-state signal further comprises providing fourth, fifth, and sixth signal portions having said second discrete state.

Although the present invention has been described with reference to specific embodiments, these embodiments are illustrative only and not limiting. Many other applications and embodiments of the present invention will be apparent in light of this disclosure and the following claims.

What is claimed is:

1. A method comprising:

obtaining a sampled binary state of a first signal, a first sampled binary state of a second signal, and a second sampled binary state of said second signal; and providing a multi-state signal having at least first, second, and third discrete states, wherein providing said multi-state signal comprises:

providing a first signal portion of said first discrete state in response to said sampled binary state of said first signal being a first binary state;

providing a second signal portion of said second discrete state in response to said sampled binary state of said first signal being a second binary state, but only upon a condition that said first sampled binary state of said second signal is the same as said second sampled binary state of said second signal; and providing a third signal portion of said third discrete state in response to said sampled binary state of said first signal being said second state, but only if said condition is false.

2. The method of claim 1, wherein said providing of said second signal portion comprises providing said second signal portion of a positive voltage state, and wherein said providing of said third signal portion comprises providing said third signal portion of a negative voltage state.

3. The method of claim 2, wherein said providing of said first signal portion comprises providing said first signal portion of a grounded voltage state.

4. The method of claim 1, wherein said providing of said multi-state signal having at least said first, second, and third discrete states further comprises:

before providing said first, second, or third signal portions, providing a fourth signal portion having said third discrete state;

wherein if said condition is true, an intermediate portion between said second and fourth portions has, at most, a first discrete state; and wherein if said condition is false, said intermediate portion between said third and fourth signal portions has, at most, said first discrete state.

5. The method of claim 1, wherein said providing of said multi-state signal having at least said first, second, and third discrete states further comprises:

before providing said first, second, or third signal portions, providing a fourth signal portion having said second discrete state;

wherein if said condition is true, an intermediate portion between said second and fourth portions has, at most, a first discrete state; and wherein if said condition is false, said intermediate portion between said third and fourth portions has, at most, said first discrete state.

6. The method of claim 1, further comprising;

obtaining a sampled binary state of a third signal, wherein said providing of said multi-state signal further comprises:

providing fourth, fifth, and sixth signal portions having said second discrete state uninterrupted by said third discrete state in response to said sampled binary state of said third signal having a predetermined one of said first or second binary states.

7. The method of claim 1, further comprising providing a first resulting binary signal, wherein said providing of said first resulting binary signal comprises:

providing a first signal portion of a first binary state in response to said multi-state signal being said first discrete state; and providing a second signal portion of a second binary state in response to said multi-state signal being said second or third discrete states.

8. The method of claim 7, further comprising providing a second resulting binary signal, wherein said providing of said second resulting binary signal comprises:

providing a first signal portion of said second resulting binary signal having a different binary state than an immediately preceding portion in response to said multi-state signal being said second discrete state; and providing a second signal portion of said second resulting binary signal having a same binary state as said immediately preceding portion in response to said multi-state signal being said third discrete state.

9. A method comprising:

receiving a multi-state signal having at least first, second, and third discrete states;

providing a first resulting binary signal, wherein said providing of said first resulting binary signal comprises:

providing a first signal portion of one of two binary states in response to said multi-state signal being said first discrete state; and providing a second signal portion of the other of two binary states in response to said multi-state signal being said second or third discrete states;

providing a second resulting binary signal, wherein said providing of said second resulting binary signal comprises:

providing a third signal portion having one of two binary states in response to said multi-state signal being said second discrete state; and providing a fourth signal portion having the other of two binary states in response to said multi-state signal being said third discrete state.

10. The method of claim 9, wherein said providing of said third signal portion comprises transitioning said second resulting binary signal, and wherein said providing of said fourth signal portion comprises maintaining said second resulting binary signal at a previous binary state of said second resulting binary signal.

* * * * *